(12) United States Patent
Chiu et al.

(10) Patent No.: US 11,808,949 B2
(45) Date of Patent: Nov. 7, 2023

(54) LENS DRIVING DEVICE FOR CAMERA, CAMERA AND ELECTRONIC APPARATUS

(71) Applicant: Changzhou Raytech Optronics Co., Ltd., Changzhou (CN)

(72) Inventors: Ching-Chung Chiu, Shenzhen (CN); Kazuo Shikama, Osaka (JP)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 107 days.

(21) Appl. No.: 17/216,718

(22) Filed: Mar. 30, 2021

(65) Prior Publication Data
US 2022/0206309 A1 Jun. 30, 2022

(30) Foreign Application Priority Data
Dec. 25, 2020 (JP) ................................. 2020-217862

(51) Int. Cl.
*G02B 27/64* (2006.01)
*G03B 30/00* (2021.01)
*G03B 5/00* (2021.01)

(52) U.S. Cl.
CPC .............. *G02B 27/646* (2013.01); *G03B 5/00* (2013.01); *G03B 30/00* (2021.01); *G03B 2205/0015* (2013.01)

(58) Field of Classification Search
CPC .......... G02B 27/646; G02B 7/08; G02B 7/02; G03B 5/00; G03B 30/00; G03B 2205/0015
See application file for complete search history.

(56) References Cited

U.S. PATENT DOCUMENTS

2015/0195460 A1* 7/2015 Yasuda .............. H04N 5/23287
  359/557
2020/0314302 A1* 10/2020 Minamisawa ....... H04N 5/2257
  (Continued)

FOREIGN PATENT DOCUMENTS

CN 103913925 A * 7/2014 ............... G03B 5/00
CN 103913925 A 7/2014
CN 111025817 A 4/2020
  (Continued)

OTHER PUBLICATIONS

Machine translation of CN103913925A (Year: 2014).*

*Primary Examiner* — Darryl J Collins
*Assistant Examiner* — Matthew Y Lee
(74) *Attorney, Agent, or Firm* — W&G Law Group

(57) ABSTRACT

The present invention provides a lens driving device, a camera and an electronic apparatus with a small size and an excellent effect in hand vibration correction. The lens driving device includes a case having an accommodation space, in which a lens module is provided. The lens module includes a lens, a lens holder receiving the lens, a support frame for freely rotating the lens holder in a direction orthogonal to an optical axis direction, support members, an electromagnetic driving device, and a base for fixing a circuit board; the electromagnetic driving device is arranged on the lens holder and the base for fixing the circuit board, and is provided adjacent to a level of a center of gravity of the lens module; and the lens module have different movement axes in a plane and is rotatable freely relative to the base for fixing the circuit board.

8 Claims, 4 Drawing Sheets

(56) References Cited

U.S. PATENT DOCUMENTS

2022/0066290 A1* 3/2022 Kim .................. G03B 13/36
2022/0137486 A1* 5/2022 Oh .................... H04N 5/2254
                                                    359/554

FOREIGN PATENT DOCUMENTS

| CN | 112099287 A | 12/2020 |
| CN | 112104799 A | 12/2020 |
| JP | 2015121818 A | 7/2015 |
| JP | 2020166179 A | 10/2020 |

* cited by examiner

LENS DRIVING DEVICE FOR CAMERA, CAMERA AND ELECTRONIC APPARATUS

TECHNICAL FIELD

The present invention relates to the field of lens driving devices for cameras, and in particular, to a lens driving device, a camera and an electronic apparatus that obtain clear images by avoiding image vibration.

BACKGROUND

With the rapid development of image shooting technology, the requirements for image quality have become higher than ever. Especially when shooting night scenes, in order to improve the shooting quality in a dark environment, there is a need to provide a bright lens or an image vibration prevention function, therefore, the lens driving devices using image vibration correction are widely used in various camera devices and portable electronic apparatuses.

The driving mechanism of the lens driving device suitable for a conventional portable electronic apparatus is generally formed by a coil fixed on an outer periphery of a lens holder, and a magnet. When a current is applied to the coil, the coil drives the lens holder to move along an optical axis direction of the lens under an action of an electromagnetic force, thereby enabling focusing. However, when the user is image shooting while holding the electronic apparatus, the lens driving device will inevitably vibrate due to hand vibration. Therefore, there is a case that the lens keeps moving in a direction orthogonal to the optical axis direction of the lens. In this case, in the lens driving device, disorder of the captured image is not suppressed, and thus the quality of the captured image is reduced.

In addition, in a conventional device for correcting hand vibration, a driving circuit of an electromagnetic driving device positioned at a bottom of the lens driving device and at a side of a shooting sensor generates driving noise towards the approaching shooting sensor. As a size of the sensor increases, a size of the lens becomes larger than before. In a liner hand vibration correction device, there are concerns about power consumption increases and about vibration correction performance deterioration in a case where rigidity of the support member is insufficient. In order to correct vibration towards the direction orthogonal to the optical axis direction, a holding method with higher rigidity may be required.

Therefore, there is a need to provide a new lens driving device that can solve the above problems.

SUMMARY

The present invention provides a new lens driving device, aiming to provide a solution of suppressing disorder of the captured image and reducing driving noise in a case where the lens keeps moving in the direction orthogonal to the optical axis direction of the lens due to vibration of the lens driving device resulted from hand vibration occurring when the user are taking pictures using a camera of an electronic apparatus or an portable terminal.

The purpose of the present invention is achieved in the following way. It should be noted that in the following description, for better illustrating the present invention, the symbols in the drawings are marked in parentheses, but the constituting elements of the present invention are not limited to the constituting elements with these marks, and shall be broadly interpreted to a scope that would be technically understood by those skilled in the art.

An embodiment of the present invention provides a lens driving device, including a case having an accommodation space; and a lens module accommodated in the accommodation space. The lens module includes: a lens; a lens holder receiving the lens; a support frame, support members, and an electromagnetic driving device, for freely rotating the lens holder in a direction orthogonal to an optical axis direction; and a base for fixing a circuit board, the electromagnetic driving device is arranged on the lens holder and the base for fixing the circuit board, and is arranged adjacent to a level of a center of gravity of the lens module, and the lens module has different movement axes in a plane and is rotatable freely relative to the base for fixing the circuit board.

As an improvement, the support members are shaft pins, and at least four shaft pins are provided.

As an improvement, the base for fixing the circuit board has a groove used for rotation in a plane along different movement axes.

As an improvement, the electromagnetic driving device includes magnets fixed to the lens module and driving coils fixed to the base for fixing the circuit board.

As an improvement, the case includes a fixing base and a cover, wherein the fixing base and the cover form the accommodation space, the fixing base is provided with second repulsive force magnets that attract in a supporting direction and are limited in position, and the lens module is provided with first repulsive force magnets arranged in a direction orthogonal to an optical axis.

As an improvement, the lens holder has holes for fixing the support members; and the first repulsive force magnets are arranged at the lens holder.

As an improvement, the lens driving device further includes a magnetic yoke support frame; and magnetic yokes installed to the magnetic yoke support frame and configured to act on the electromagnetic driving device.

As an improvement, each of the driving coils is arranged at an outer side of a respective one of the magnets, and the driving coils are configured to clamp the magnets with respect to an optical axis and generate an electromagnetic effect.

The present invention further provides a camera, including the lens driving device described above.

The present invention further provides a portable electronic apparatus, including the camera described above.

As an advantage of the present invention, the lens driving device of the present invention is capable of adjusting movement of the optical axis of the lens and restricting rotation, thereby achieving a purpose of preventing vibration and improving the quality of the captured image.

Figure 1:
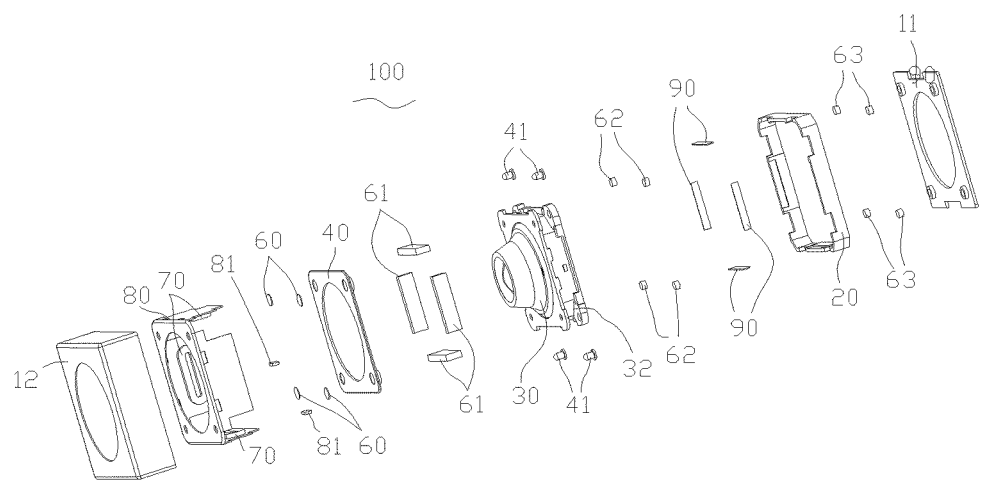
FIG. 1 is an exploded perspective view of a lens driving device according to an embodiment of the present invention.
Figure 2:
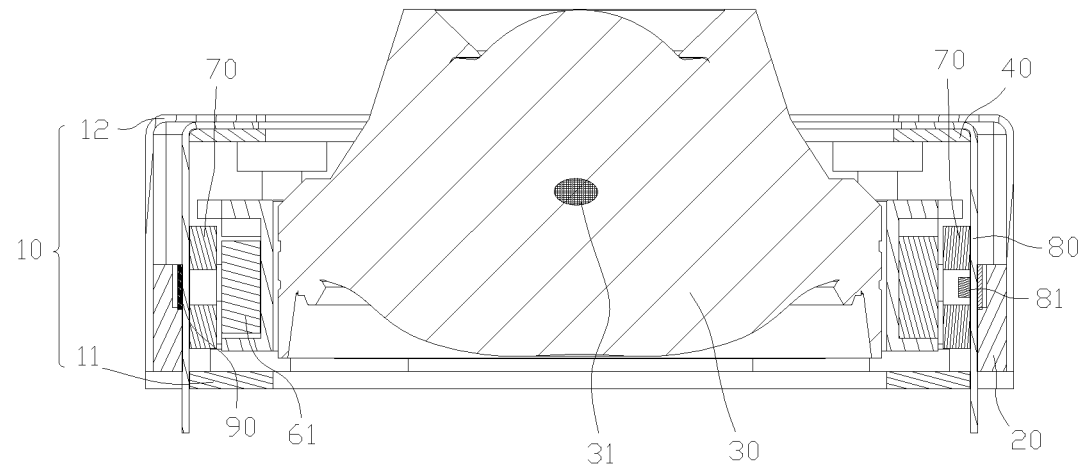
FIG. 2 is a first cross-sectional view of a lens driving device according to an embodiment of the present invention.
Figure 3:
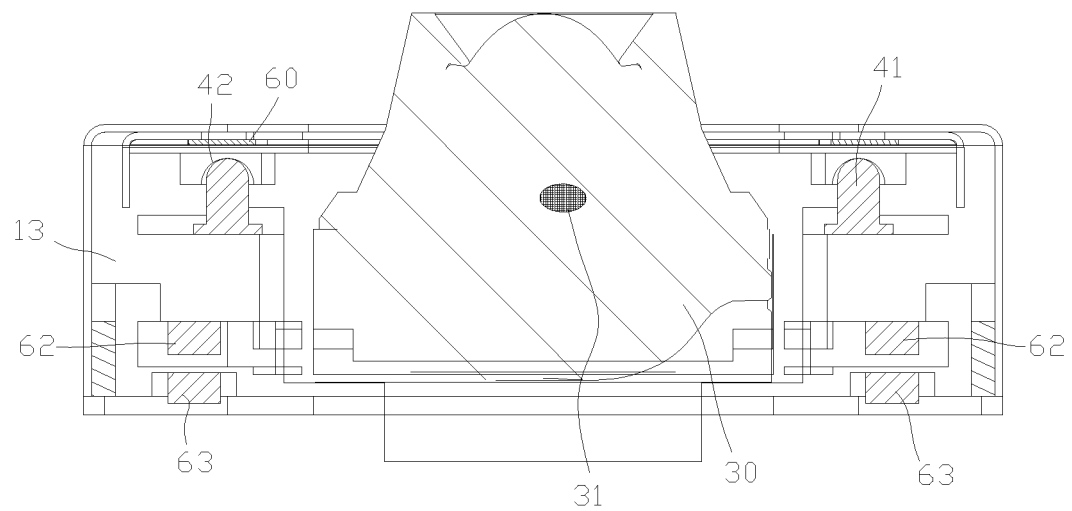
FIG. 3 is a second cross-sectional view of a lens driving device according to an embodiment of the present invention.
Figure 4:
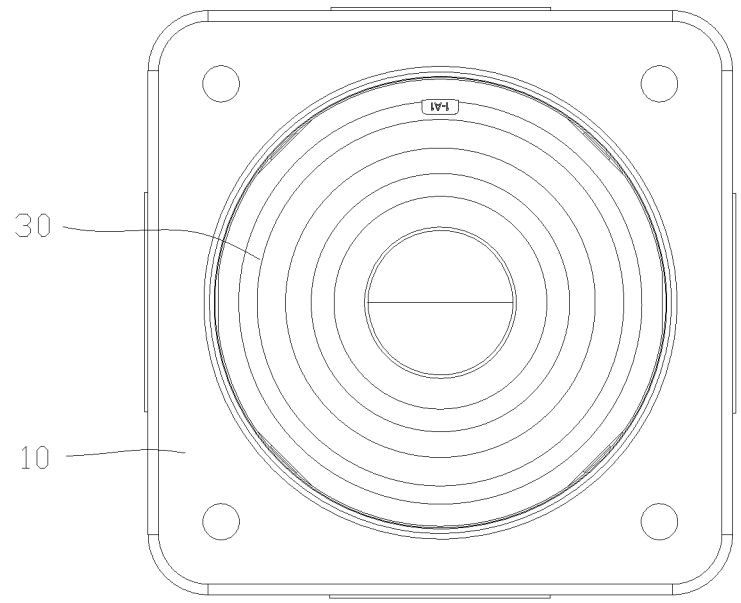
FIG. 4 is a front view of a lens driving device according to an embodiment of the present invention.
Figure 5:
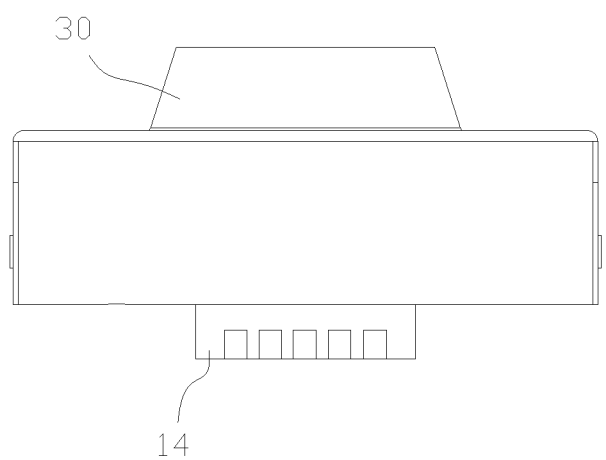
FIG. 5 is a left view of a lens driving device according to an embodiment of the present invention.
Figure 6:
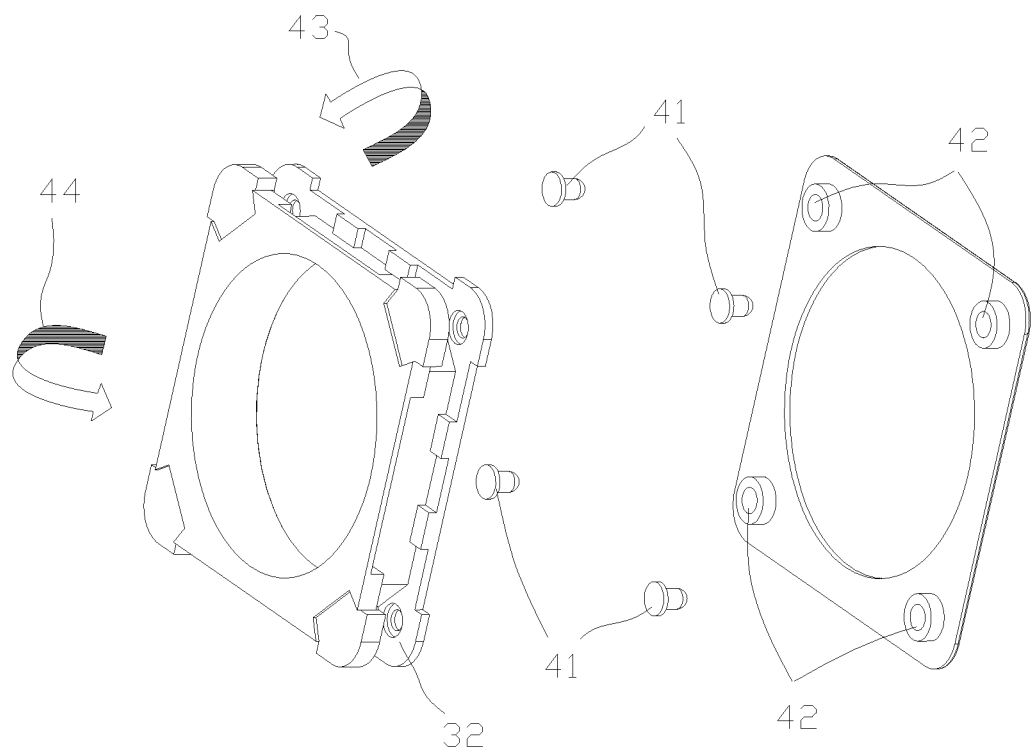
FIG. 6 is an exploded perspective view of a base for fixing a circuit board and a support member according to an embodiment of the present invention.

REFERENCE SIGNS 10 case
11 fixing base
12 cover
13 accommodation space
14 connection terminal provided at a base for fixing a circuit board and connected to the outside
20 magnetic yoke support frame
30 lens module
31 center of gravity of the lens module
32 lens holder
40 base for fixing a circuit board
41 support member
42 groove configured to limit a direction of the support member provided on a support frame
43 first rotation optical axis direction that is limited
44 second rotation optical axis direction that is limited
60 magnetic body that performs attraction limitation on the support member
61 magnet
62 first repulsive force magnet
63 second repulsive force magnet
70 driving coil
80 circuit board
81 magnetic detecting element including a driving circuit
90 magnetic yoke
100 lens driving device
200 portable information apparatus
300 camera device

DESCRIPTION OF EMBODIMENTS

Hereinafter, the present invention will be described in detail with reference to the drawings.

FIG. 1 to FIG. 5 illustrate a lens driving device 100 according to the present invention.

The lens driving device 100 includes a case 10, a lens module 30, a base for fixing a circuit board 40, support members 41, magnetic bodies 60, and driving coils 70.

The case 10 has an accommodation space 13, and the case 10 contains a fixing base 11, a cover 12 that is in cooperation with the fixing base 11 to form the accommodation space 13, and a circuit board 80.

The base 40 for fixing the circuit board includes a groove 42 that limits a direction of the support members 41 provided at the lens module 30, and the circuit board 80 and the driving coils 70 that are fixed to the base 40 for fixing the circuit board.

The lens module 30 includes a lens and a lens holder 32.

The fixing base 11 includes second repulsive force magnets 63 arranged at the fixing base 11 in a direction orthogonal to an optical axis direction, and the fixing base 11 is accommodated in the accommodation space 13 of the case 10. The lens module 30 includes first repulsive force magnets 62 arranged in a direction orthogonal to the optical axis direction, and the lens module 30 is accommodated in the base 40 for fixing the circuit board. The lens module 30 includes a lens (not shown). Similarly, it is accommodated in the accommodation space 13 of the case 10.

The support members 41 supports the lens module 30 and the base 40 for fixing the circuit board in such a manner that the lens module 30 is rotatable freely relative to the fixing base 11 in a direction orthogonal to the optical axis of the lens.

The support members 41 may be shaft pins, and at least four shaft pins (i.e., support members 41) are provided. Correspondingly, with rotation axes that are limited by grooves 42 which are formed in the base 40 for fixing the circuit board and the lens module 30 and which limit directions of the support members arranged on the base for fixing the circuit board, through rolling of the shaft pins 41, the lens module 30 can freely rotate in a first rotation optical axis direction 43 that is limited and in a second rotation optical axis direction 44 that is limited, based on a direction orthogonal to the optical axis of the lens.

In addition, the base 40 for fixing the circuit board, four support members 41, the lens module 30, and the fixing base 11 are sequentially assembled along the optical axis direction. Through a magnetic action of the magnetic bodies 60 that perform attraction limitation on the support members 41 provided at the lens module 30 and the support members provided at the base 40 for fixing the circuit board, these members are attracted toward the optical axis direction so that they will not fall off in any direction.

Magnets 61 are installed and fixed to the lens module 30.

The first repulsive force magnets 62 are installed and fixed to the lens module 30.

The second repulsive force magnets 63 are installed and fixed to the fixing base 11.

The lens driving device 100 is provided with magnetic yokes 90, which are installed and fixed to a magnetic yoke support frame 20, and have a function of pulling the magnets 61 towards an optical axis center when the lens module rotates in a direction perpendicular to the optical axis direction.

Alternatively, it has a reaction force that presses towards the optical axis center when rotating, due to a magnetic action of the first repulsive force magnets 62 provided at the lens module 30 and the second repulsive force magnets 63 provided at the fixing base 11.

The driving coils 70 are provided at the circuit board 80 that is fixed to the base 40 for fixing the circuit board, and each driving coil 70 is correspondingly provided at an outer side of a respective one of the magnets 61.

The driving coil 70 may be a coil winding integrated with the circuit board 80 installed and fixed to the base 40 for fixing the circuit board, or may be a conductive pattern directly formed on the circuit board 80. Due to an electromagnetic effect between the driving coils 70 and the magnets 61, the magnetic yoke support frame 20 can rotate and move relative to the base 40 for fixing the circuit board in the direction orthogonal to the optical axis of the lens, thereby achieving adjustment related to rotation and movement of the optical axis of the lens.

The lens driving device 100 is further provided with the circuit board 80.

The circuit board 80 is connected to the driving coils 70.

Corresponding to the driving coils 70, four magnets 61 are provided and arranged at positions that are center symmetrical with respect to the optical axis of the lens, that is, at positions that are symmetrical with respect to a center line.

The driving coils 70 may be connected to a connection terminal 14, which is provided at the fixing base 11 and connected to the outside, or may also be connected to a magnetism detecting element 81 including a driving circuit, e.g., a magnetism detecting element 81 having a second driving circuit, or a driver IC with a magnetism detecting function. The magnetism detecting element 81 having the second driving circuit is located at a position opposed to the magnets 61 and can detect a position of the magnet 61 which moves together with the lens module 30.

In a case where the optical axis of the lens moves or tends to move due to hand vibration, it can allow a current to flow into the driving coils 70 installed near a level of the center of gravity of the lens module 31, and the driving coils 70 are fixed. Therefore, according to a principle of action force and reaction force, it can achieve that the lens module 30 is efficiently balanced with respect to a center of gravity of the moving object and rotates and rotates and moves relative to the base 40 for fixing the circuit board in the direction orthogonal to the optical axis of the lens, or can suppress movement tendency of the optical axis of the lens. Therefore, movement of the optical axis of the lens can be adjusted.

Figure 7:
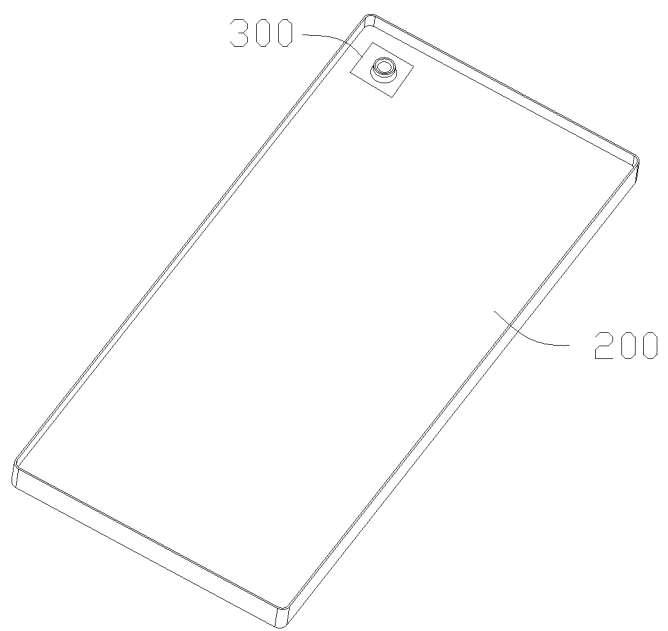
FIG. 7 illustrates a portable electronic apparatus (portable information terminal) including a lens driving device according to an embodiment of the present invention.

The lens driving device 100 described above can be used in, for example, a camera device 300 applied to a portable information apparatus 200 such as a smart phone, a feature phone, or a tablet device, as shown in FIG. 7.

According to the lens driving device 100 of the present invention, movement of the optical axis of the lens can be adjusted, thereby achieving a purpose of preventing vibration, and thus improving the quality of the captured image.

The above description are merely preferred embodiments of the present invention, and a protection scope of the present invention is not limited to the above-described embodiments. Equivalent modifications or variations made by those skilled in the art based on the disclosure of the present invention are all included in the scope claimed by the claims of the present application.

What is claimed is:

1. A lens driving device, comprising:
    a case having an accommodation space; and
    a lens module accommodated in the accommodation space,
    wherein the lens module comprises:
    a lens; a lens holder receiving the lens;
    a support frame, support members, and an electromagnetic driving device, for freely rotating the lens holder in a direction orthogonal to an optical axis direction; and
    a base for fixing a circuit board,
    wherein the electromagnetic driving device is arranged on the lens holder and the base for fixing the circuit board, and is arranged adjacent to a level of a center of gravity of the lens module, and
    wherein the lens module has different movement axes in a plane and is rotatable freely relative to the base for fixing the circuit board;
    wherein the support members are shaft pins, and at least four shaft pins are provided;
    the base has a groove that limits a direction of the shaft pins, through rolling of the shaft pins, the lens module can freely rotate in two different rotation directions that are limited;
    the axial directions of the shaft pins are parallel to the optical axis direction.

2. The lens driving device as described in claim 1, wherein the electromagnetic driving device comprises magnets fixed to the lens module and driving coils fixed to the base for fixing the circuit board.

3. The lens driving device as described in claim 2, wherein each of the driving coils is arranged at an outer side of a respective one of the magnets, and the driving coils are configured to clamp the magnets with respect to an optical axis and generate an electromagnetic effect.

4. The lens driving device as described in claim 1, wherein the case comprises a fixing base and a cover, wherein the fixing base and the cover form the accommodation space,
    wherein the fixing base is provided with second repulsive force magnets that attract in a supporting direction and are limited in position, and
    wherein the lens module is provided with first repulsive force magnets arranged in a direction orthogonal to an optical axis.

5. The lens driving device as described in claim 4, wherein the lens holder has holes for fixing the support members; and the first repulsive force magnets are arranged at the lens holder.

6. The lens driving device as described in claim 1, further comprising:
    a magnetic yoke support frame; and
    magnetic yokes installed to the magnetic yoke support frame and configured to act on the electromagnetic driving device.

7. A camera, comprising the lens driving device as described in claim 1.

8. A portable electronic apparatus, comprising the camera as described in claim 7.

* * * * *